United States Patent
Rowell

(10) Patent No.: US 6,835,150 B1
(45) Date of Patent: Dec. 28, 2004

(54) METHOD OF SEALING LOW/REVERSE PISTON FLUID CIRCUIT WITHIN AN AUTOMATIC TRANSMISSION CASE

(75) Inventor: Brian G. Rowell, Saxtons River, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 21 days.

(21) Appl. No.: 10/340,950

(22) Filed: Jan. 13, 2003

Related U.S. Application Data

(60) Provisional application No. 60/348,262, filed on Jan. 15, 2002.

(51) Int. Cl.[7] ......................... F16H 31/00; B23P 19/04; F16L 17/00
(52) U.S. Cl. ..................... 475/116; 29/402.08; 277/616
(58) Field of Search ................................. 475/146, 116; 192/85 AA, 85 R; 29/402.02, 402.08, 402.09, 402.11; 277/602, 608, 609, 616

(56) References Cited

U.S. PATENT DOCUMENTS

| | | | | |
|---|---|---|---|---|
| 2,186,277 A | * | 1/1940 | Tetens | 277/505 |
| 4,210,034 A | * | 7/1980 | Younger | 74/606 R |
| 4,232,496 A | * | 11/1980 | Warkentin | 403/288 |
| 4,442,733 A | * | 4/1984 | Hartz | 74/606 R |
| 4,617,711 A | * | 10/1986 | McMinn | 29/402.06 |
| 5,035,155 A | * | 7/1991 | Robledo | 74/467 |
| 5,619,888 A | * | 4/1997 | Anthony | 74/606 R |

OTHER PUBLICATIONS

Engine tips & Tricks: more helpful hints and mindful motor short cuts. Jeff Smith, Hot Rod, v46, n10, p76(4). Oct. 1993.*

* cited by examiner

*Primary Examiner*—Roger Pang
(74) *Attorney, Agent, or Firm*—Clifford F. Rey

(57) ABSTRACT

An apparatus and method for repairing hydraulic fluid leakage from the low/reverse gear fluid circuit of an automatic transmission case is disclosed. The present repair kit comprises a deformable grommet seal used in combination with a steel shim to replace the original equipment gasket, which is the source of the fluid leakage. Installation of the steel shim compresses the grommet seal in the fluid passage thereby creating a leakproof seal and maintaining the integrity of the low/reverse piston fluid circuit. In addition, the steel shim functions as a spacer in replacement of the original equipment manufacture gasket, which is discarded, and also provides a non-compressible backing surface to prevent distortion of the piston retainer when it is assembled and fastened against the shim.

15 Claims, 7 Drawing Sheets

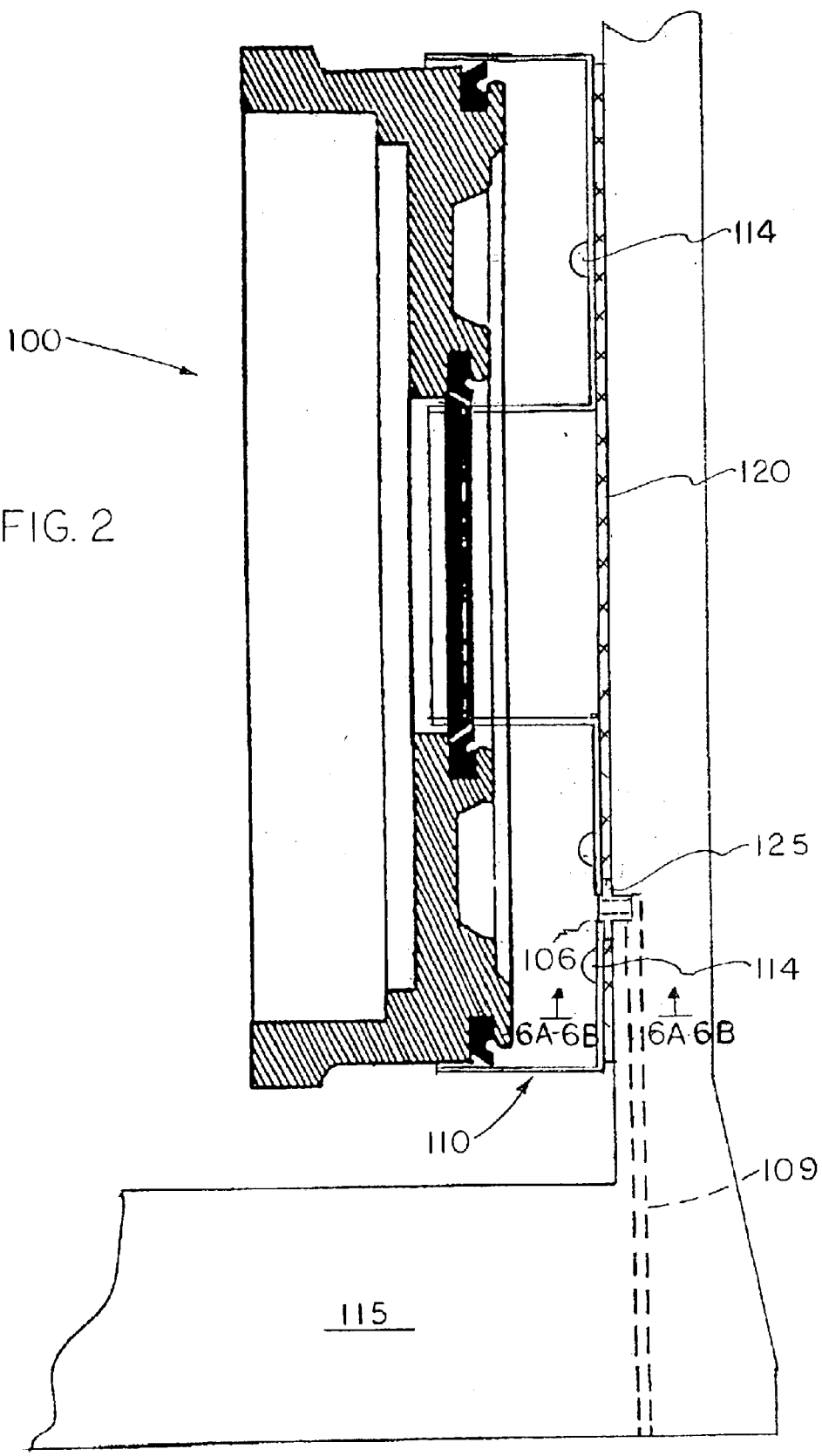

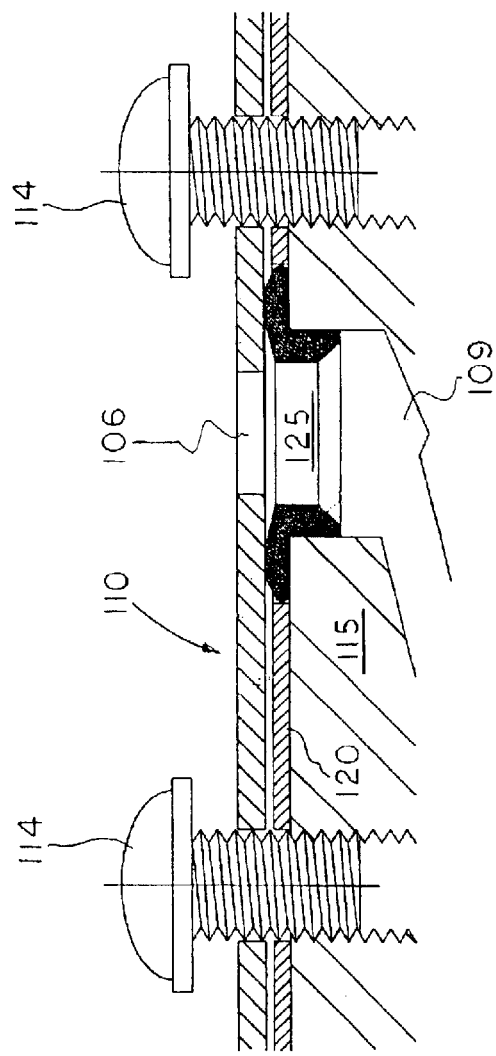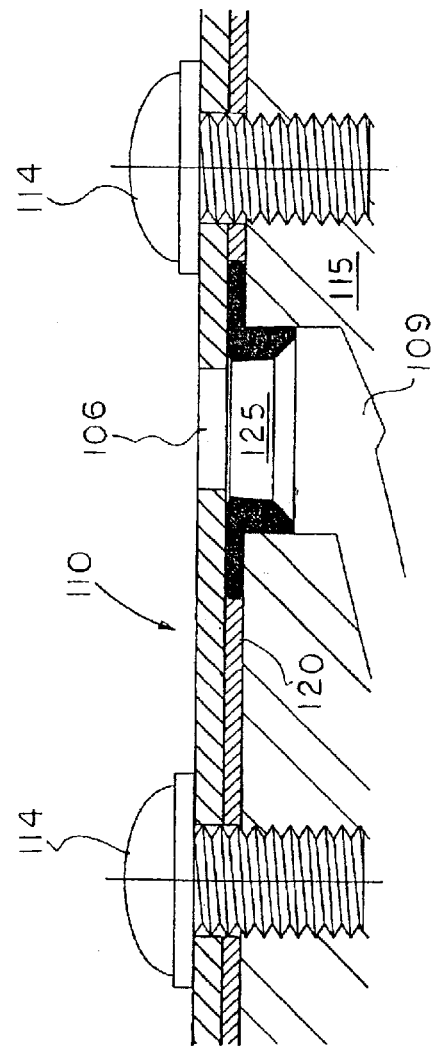

Ｕ S 6,835,150 B1

METHOD OF SEALING LOW/REVERSE PISTON FLUID CIRCUIT WITHIN AN AUTOMATIC TRANSMISSION CASE

CROSS-REFERENCE TO RELATED APPLICATION

This patent application claims the benefit under 35 U.S.C. 119(e) of U.S. Provisional Patent Application No. 60/348,262 filed Jan. 15, 2002, entitled Method of Sealing Low/Reverse Piston Fluid Circuit.

BACKGROUND OF INVENTION

The present invention relates generally to automatic transmission systems and, more particularly, to a method of sealing the low/reverse gear fluid circuit within an automatic transmission case utilizing a grommet seal in combination with a steel shim in place of an original equipment manufacture (hereinafter "OEM") gasket.

A common service complaint in Chrysler A604 (40TE, 41TE) automatic transmissions (hereinafter "Chrysler transmissions) involves a poorly functioning and/or worn out low/reverse clutch resulting from automatic transmission fluid (hereinafter "ATF") leakage in the low/reverse piston fluid circuit. Such fluid leakage is problematic in the aforementioned Chrysler transmissions because of the design of the low/reverse piston retainer. Instead of being machined into the transmission case as in previous automatic transmission designs, the low/reverse piston retainer is a stamped steel construction that is mounted on the interior surface of the transmission case being spaced apart therefrom by a relatively thin, flexible gasket. As a result the piston retainer has a tendency to distort due to its thin-walled construction even when the machine bolts, which secure it to the transmission case, are applied with the specified torque (i.e. 40 inch/pounds) against the flexible gasket. Thus, the OEM gasket, which is intended to seal an ATF feed passage extending through the piston retainer and gasket and into the transmission case, is insufficient to maintain the integrity of this fluid circuit and results in ATF leakage at the mating surfaces thereof.

DESCRIPTION OF RELATED PRIOR ART

One example of a prior art invention that attempts to remedy this problem is shown in U.S. Pat. No. 5,619,888 to Anthony which discloses a reinforcement member for a piston retainer in the form of an arcuate plate for installation within the piston retainer adjacent the A1° F. feed passage. Although the arcuate reinforcement member provides for increased pressure and surface area for contacting the fluid actuator adjacent the ATF feed passage, it does not extend completely around the surface of the piston retainer. This technique still requires compression of the gasket material to seal around the ATF feed passage, which is the root cause of the leakage. Thus, distortion of the sheet metal piston retainer and subsequent fluid leakage can still occur.

Accordingly, the present invention has been developed to resolve this problem and other shortcomings of the prior art.

SUMMARY OF THE INVENTION

The present invention provides a repair method and apparatus comprising a fluorocarbon grommet seal for installation within the subject ATF feed passage in the transmission case in combination with a steel shim, which compresses the seal in position and maintains the integrity of the low/reverse piston fluid circuit. The steel shim functions as a spacer in substitution for the OEM gasket and also provides a non-compressible backing surface to prevent distortion of the piston retainer when installed.

Thus, by removing the OEM gasket from the interface of the piston retainer and the transmission case, the cause of the ATF leakage is eliminated.

Other features and technical advantages of the present invention will become apparent from a study of the following description and the accompanying drawings.

BRIEF DESCRIPTION OF THE DRAWINGS

The novel features of the present invention are set forth in the appended claims.

The invention itself, however, as well as other features and advantages thereof will be best understood by reference to the following detailed description of an illustrative embodiment when read in conjunction with the accompanying figures, wherein:

FIG. 2 is an enlarged cross-sectional view of the transmission case of FIG. 1 illustrating the low/reverse piston and piston retainer showing the location of the replacement steel shim and grommet seal of the present invention;

FIG. 6A is an enlarged cross-sectional view taken along section line 6A—6A of FIG. 2 illustrating the present invention in the process of being assembled; and FIG. 6B is an enlarged cross-sectional view taken along section line 6B—6B of FIG. 2 illustrating the integrity of the seal in a completed installation.

DETAILED DESCRIPTION OF THE PREFERRED EMBODIMENTS

Prior to describing the present invention in detail, it may be useful to briefly review the structure and function of the low/reverse piston and piston retainer of the Chrysler A604 transmission wherein the present invention is utilized. Although the following disclosure is directed primarily to the Chrysler A604 transmission for purposes of explanation, it will be understood that the present inventive concept is applicable to transmissions of other manufacturers having a similar configuration and, as such, are considered to be within the scope of the present invention.

Figure 1A:
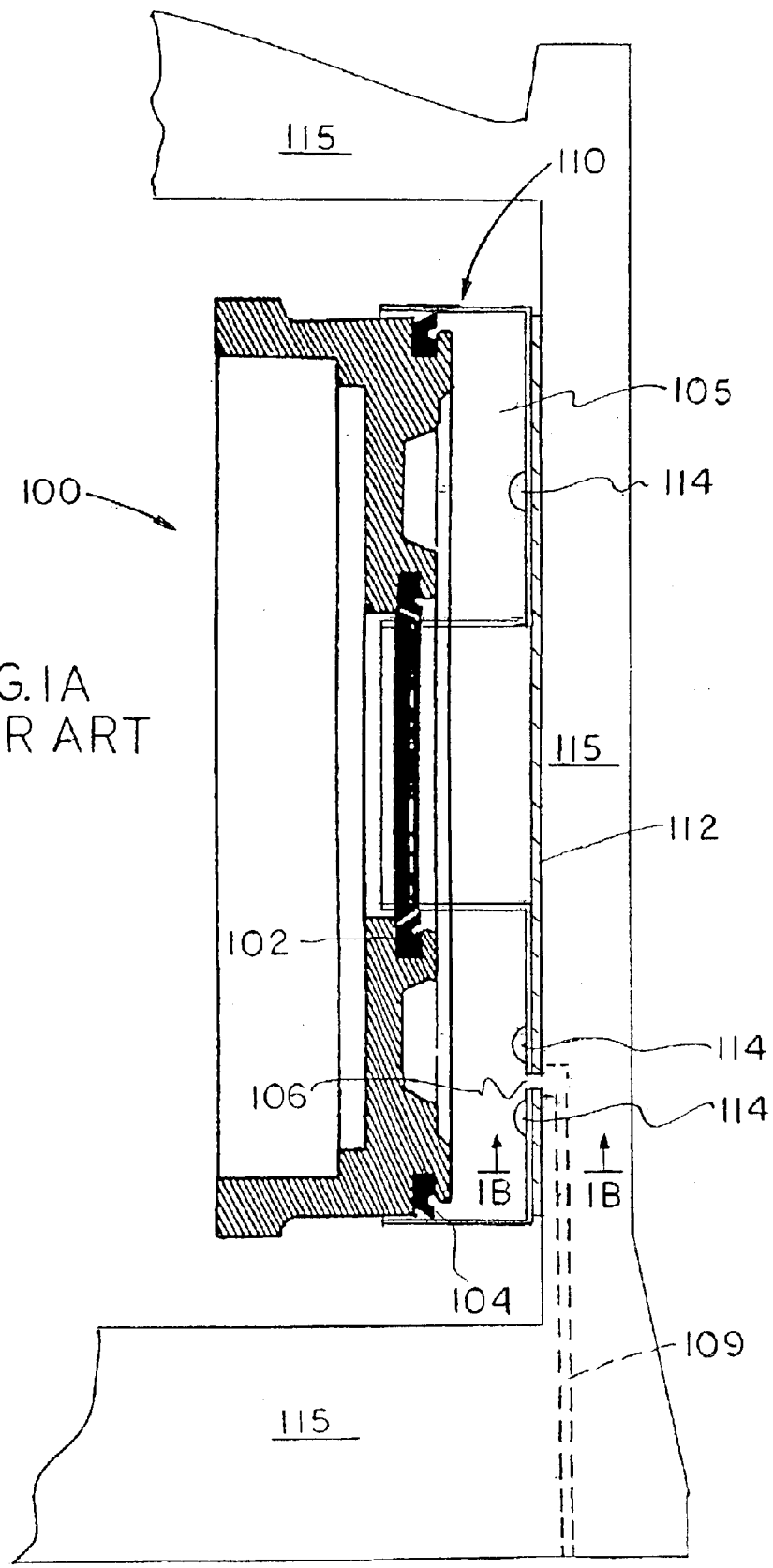
FIG. 1A is a cross-sectional view of a transmission case labeled Prior Art illustrating the low/reverse piston and piston retainer and showing the location of the OEM gasket.

With reference to the drawings there is shown therein a prior art Chrysler A604 low/reverse piston, indicated generally at 100, installed within a piston retainer, indicated generally at 110, and illustrated in FIG. 1A. The OEM piston retainer 110 is a stamped sheet metal construction, which is designed to receive the low/reverse piston 100 in sliding engagement therein. Internal and external lip seals 102, 104 respectively provide a hydraulic seal for the piston chamber 105 to actuate the low/reverse clutch.

More particularly, when the low/reverse piston 100 is actuated, ATF flows into piston chamber 105 from the fluid passage 109 formed in the transmission case 115, through the gasket 112, and through the inlet opening 106 formed in the low/reverse piston retainer 110. ATF fills the piston chamber 105 applying pressure to the piston 100 to engage the low/reverse clutches. It will be understood that in the OEM design, the gasket 112 is disposed between the piston retainer 110 and the transmission case 115 to seal the inlet opening 106 and to maintain the integrity of the fluid circuit. The OEM gasket 112 is fabricated from a composite gasket material in the range of 0.018" to 0.024" thickness.

Figure 1B:
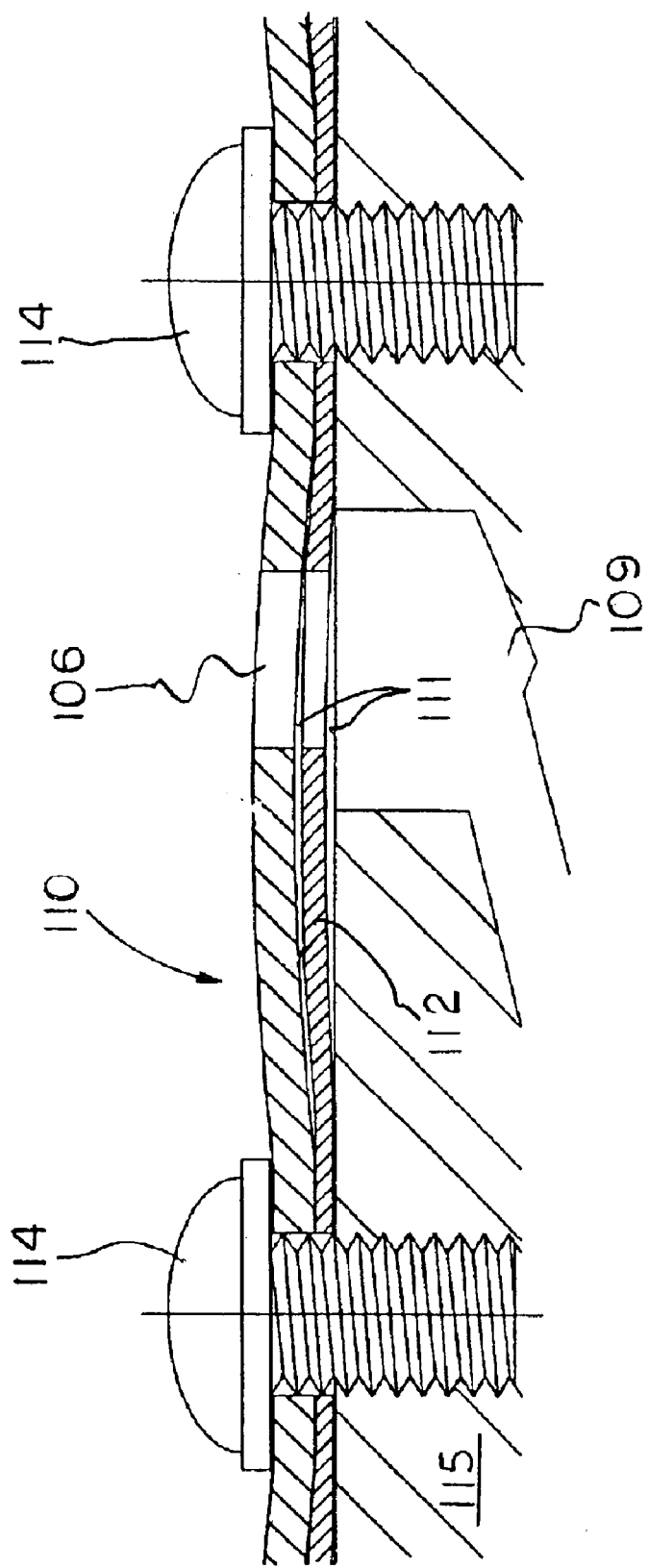
FIG. 1B is an enlarged cross-sectional view taken along section line 1B—1B of FIG. 1A illustrating the leakage mode of the Prior Art piston retainer.

A problem exists with this design in that the stamped, sheet metal construction of the low/reverse retainer 110 has a tendency to distort (FIG. 1B) at the interface with the gasket 112 even if machine bolts 114 are tightened with minimal torque (ie. 40 inch/pounds), which is the recommended torque for this application. This is because the low/reverse retainer 110 is too thin to be supported by a flexible gasket 112 in this particular application. Thus, it is common for ATF leakage to occur as at 111 at the juncture of the inlet opening 106 and the gasket 112 as seen in FIG. 1B. As a result there is insufficient ATF flow to the low/reverse clutches, which can cause delayed engagement, chatter and slippage of the clutches and eventually complete failure.

Accordingly, the present invention has been developed to resolve this problem and will now be described. Referring to FIG. 2 the present invention provides a repair kit and method of use including a circular steel shim 120 in substitution for the OEM gasket 112 and a sealing means, which are utilized in combination to remedy the leakage problem. The present invention provides a deformable sealing means including, but not limited to, the following structures. A grommet seal 125, which is fabricated from fluorocarbon rubber or other material suitable for this application, has been designed for insertion directly into the ATF feed passage 109 as shown in FIG. 2.

Figure 3A:
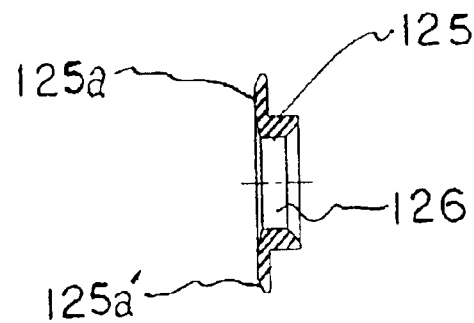
FIG. 3A is a cross-sectional view of the grommet seal of the present invention.
Figure 3B:
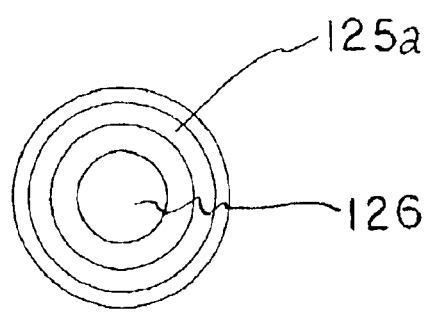
FIG. 3B is an elevational view of the present grommet seal.

As more clearly shown in FIGS. 3A and 3B, grommet seal 125 is a generally flattened cylindrical construction having a central bore 126. In the embodiment shown grommet seal 125 includes a perpendicular flange 125a integrally formed thereon, which further includes a tapered outer edge portion 125a that renders it more easily compressed after installation within fluid passage 109 (FIGS. 6A and 6B).

Figure 4:
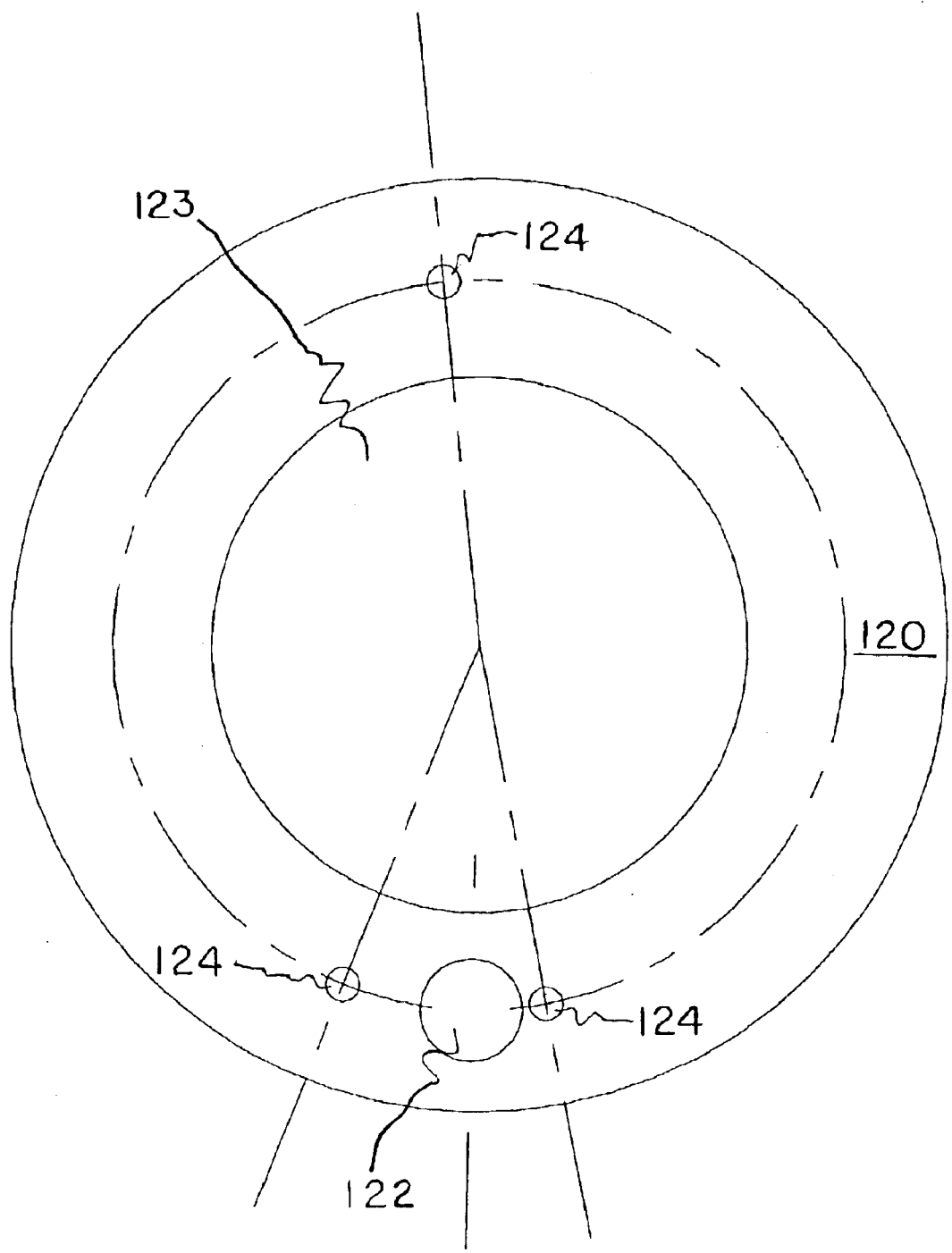
FIG. 4 is an elevational view of the steel shim of the present invention.

In the present invention a steel shim 120 as most clearly shown in FIG. 4 replaces the OEM gasket 112. In the preferred embodiment the shim 120 is constructed of sheet steel in the range of 0.018" to 0.024". The shim 120 functions to support the mating surface of the piston retainer 110 maintaining it in a flat condition to prevent distortion thereof and also functions as a spacer in substitution for the OEM gasket 112.

Still referring to FIG. 4, it can be seen that the steel shim 120 is a flattened, circular construction having a central opening 123 and conforms to the approximate dimensions of the mating surface of the piston retainer 110 and the OEM gasket 112. Shim 120 is provided with an ATF port 122 conforming approximately to the O.D. dimension of the perpendicular flange 125a of the grommet seal 125. Shim 120 is also provided with a pattern of three bolt holes 124 formed in predetermined locations corresponding to threaded holes 127 (FIG. 5A) formed in the transmission case 115.

Figure 5A:
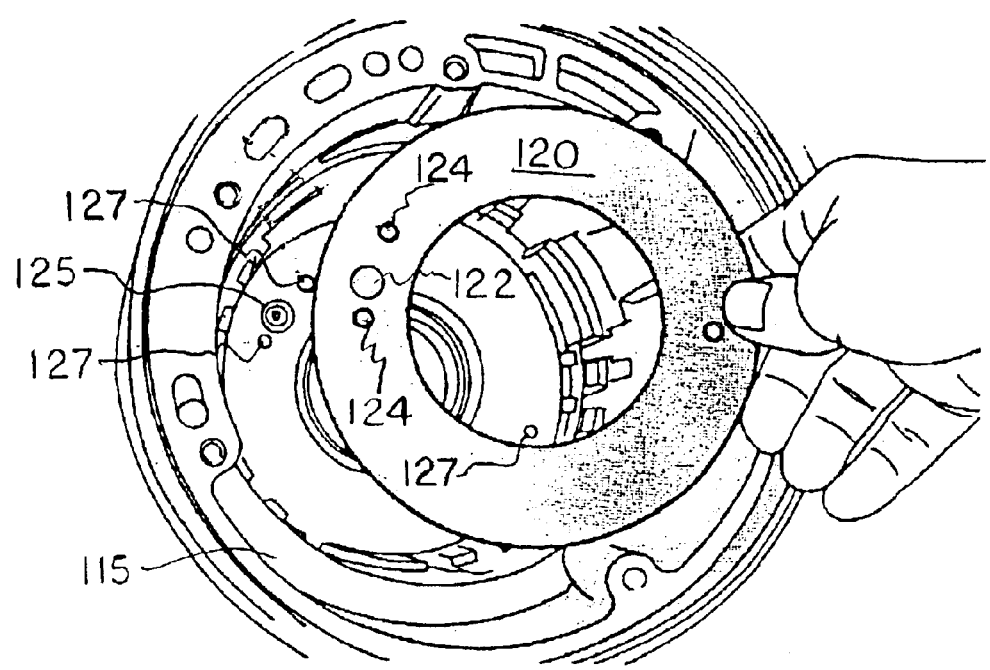
FIG. 5A is a perspective view illustrating the installation procedure for the present grommet seal and steel shim.
Figure 5B:
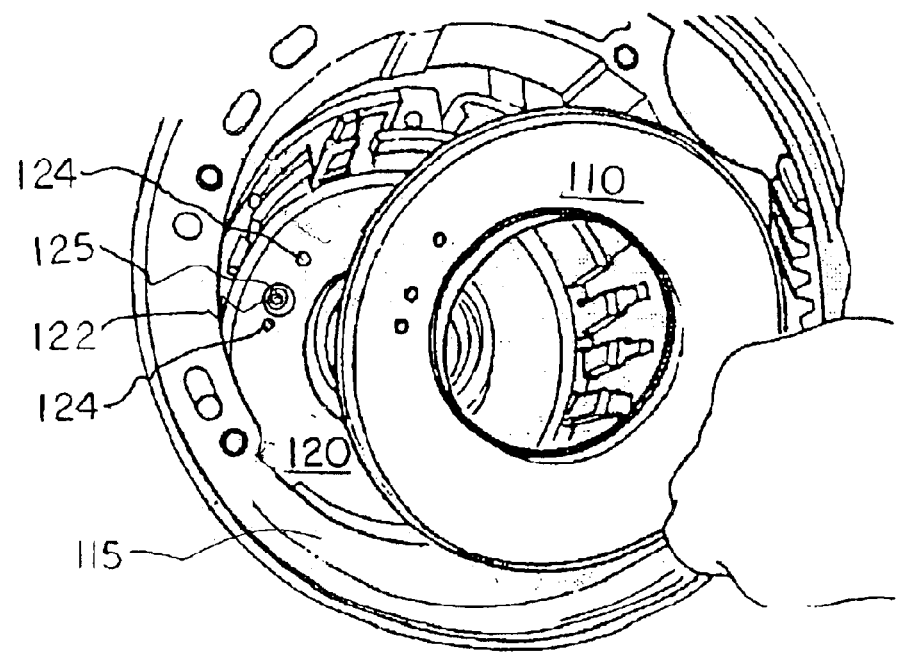
FIG. 5B is a perspective view illustrating the installation of the OEM piston retainer onto the present steel gasket and grommet seal.

In an assembly procedure of the present invention grommet seal 125 is initially pressed into the fluid passage 109 such that the flange 125a faces up as shown in FIG. 5A. Next, the steel shim $1_{20}$ is placed in position such that the ATF port 122 is disposed in alignment with grommet seal 125 and threaded holes 127. Next, the OEM piston retainer 110 is reinstalled onto the steel shim 120 and machine screws 114 are replaced in threaded holes 127 as shown in FIG. 6A. Thereafter, machine screws 114 are tightened to the specified torque and the grommet seal 125 is compressed against the mating surfaces of the piston retainer 110, the steel shim 120, and the transmission case 115 to affect a leakproof installation as shown in FIG. 6B.

It will be appreciated by those skilled in the art that by securing the piston retainer 110 against the surface of the steel shim 120, any distortion of its sheet metal structure is effectively eliminated. Thus, the leakage problem at the juncture of the piston retainer 110 and the transmission case 115 is resolved and the integrity of the fluid circuit is maintained.

Although not specifically illustrated in the drawings, it should be understood that additional equipment and structural components will be provided as necessary and that all of the components described above are arranged and supported in an appropriate fashion to form a complete and operative method of sealing the low/reverse piston retainer fluid circuit incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A method of repairing hydraulic leakage from a low/reverse piston fluid circuit of an automatic transmission case wherein the transmission case includes a piston retainer attached to an interior surface thereof in fluid communication with a fluid passage formed in the transmission case, said piston retainer defining a piston chamber wherein hydraulic fluid is delivered under pressure to actuate a low/reverse clutch of said transmission, said fluid passage being sealed by a gasket disposed intermediate said piston retainer and said transmission case, said method comprising the steps of:

removing said piston retainer and said gasket from said transmission case;

inserting a grommet seal into the fluid passage in fluid communication with said piston retainer;

replacing said gasket with a steel shim having the approximate dimensions of said gasket; and reinstalling said piston retainer such that said grommet seal is captured between said steel shim and the transmission case, said grommet seal, said steel shim, and said piston retainer being disposed in fluid communication with the fluid passage providing a leakproof low/reverse piston fluid circuit.

2. The method of claim 1 wherein the step of reinstalling further includes the steps of:

correcting any distortion in the surface of said piston retainer that abuts said steel shim;

fastening said piston retainer to the transmission case; and compressing said grommet seal within the fluid passage with said steel shim such that a leakproof seal is formed therebetween.

3. The method of claim 2 wherein the step of fastening is carried out by a torque wrench applying in the range of 25 to 50 inch pounds of torque.

4. A repair kit for sealing a low/reverse piston fluid circuit of an automatic transmission case wherein the transmission case includes a piston retainer attached to an interior surface thereof in fluid communication with a fluid passage formed in the transmission case comprising:

a circular shim having a central opening conforming to the approximate dimensions of the piston retainer, said shim including a fluid port for installation in fluid communication with the fluid passage; and deformable sealing means for installation within said fluid passage in fluid communication with the piston retainer, said deformable sealing means comprising a grommet seal fabricated from a fluorocarbon rubber material, said grommet seal having a flattened cylindrical construction including a central opening for alignment within said fluid passage, said grommet seal further including a perpendicular flange member having an outwardly tapered outer edge portion, said sealing means being disposed intermediate said shim and the transmission case.

5. The repair kit of claim 4 wherein said shim includes a pattern of bolt holes formed therein at a predetermined locations for alignment with a matching pattern of threaded holes formed in the transmission case.

6. The repair kit of claim 5 wherein said fluid port is positioned at a predetermined angular relationship to said pattern of bolt holes.

7. The repair kit of claim 5 wherein said shim is constructed of sheet steel material in the range of 0.018 to 0.024 inches thickness.

8. A repair kit for sealing a low/reverse piston fluid circuit of an automatic transmission case wherein the transmission case includes a piston retainer attached to an interior surface thereof in fluid communication with a fluid passage formed in the transmission case comprising:

a circular shim having a central opening conforming to the approximate dimensions of the piston retainer, said shim including a fluid port for installation in fluid communication with the fluid passage, said shim further including a pattern of bolt holes formed therein at predetermined locations for alignment with a matching pattern of threaded holes formed in the transmission case; and a deformable grommet seal having a flattened cylindrical construction including a central opening for installation in fluid communication with the fluid passage and disposed intermediate said shim and the transmission case.

9. The repair kit of claim 8 wherein said fluid port is positioned at a predetermined angular orientation to said pattern of threaded holes.

10. The repair kit of claim 9 wherein said shim is constructed of sheet steel material in the range of 0.018 to 0.024 inches thickness.

11. The repair kit of claim 8 wherein said grommet seal is fabricated of a fluorocarbon rubber material.

12. The repair kit of claim 11 wherein said grommet seal includes a perpendicular flange member having an outwardly tapered outer edge portion.

13. An improved low/reverse piston retainer assembly for use in combination with an automatic transmission case including a low/reverse piston disposed within a piston retainer, wherein the piston retainer is attached to an interior surface of the transmission case in fluid communication with a low/reverse fluid passage formed in the transmission case, wherein the piston retainer defines a piston chamber into which hydraulic fluid is delivered under pressure from the fluid passage, the improvements comprising:

a steel shim conforming to the approximate dimensions of the piston retainer, said shim including a fluid port disposed in fluid communication with the fluid passage; and deformable sealing means for installation within said fluid passage in fluid communication with the piston retainer, said sealing means being disposed intermediate said shim and the transmission case.

14. The improved low/reverse piston retainer assembly of claim 13 wherein said deformable sealing means comprises a grommet seal having a flattened cylindrical construction including a central opening for insertion within the fluid passage intermediate said shim and the transmission case.

15. The improved low/reverse piston retainer assembly of claim 14 wherein said grommet seal is fabricated from a fluorocarbon rubber material.

* * * * *

UNITED STATES PATENT AND TRADEMARK OFFICE
CERTIFICATE OF CORRECTION

PATENT NO.     : 6,835,150 B1
DATED          : December 28, 2004
INVENTOR(S)    : Brian G. Rowell It is certified that error appears in the above-identified patent and that said Letters Patent is hereby corrected as shown below:

Column 1,
Line 49, change "A1ºF" to -- ATF --.

Column 4,
Line 4, change "$1_{20}$" to -- 120 --.

Signed and Sealed this

First Day of March, 2005

JON W. DUDAS
*Director of the United States Patent and Trademark Office*